J. F. BASTEL & J. F. BAUMGARTNER.
HUB FOR VEHICLE WHEELS.
APPLICATION FILED OCT. 21, 1907.
904,112.
Patented Nov. 17, 1908.
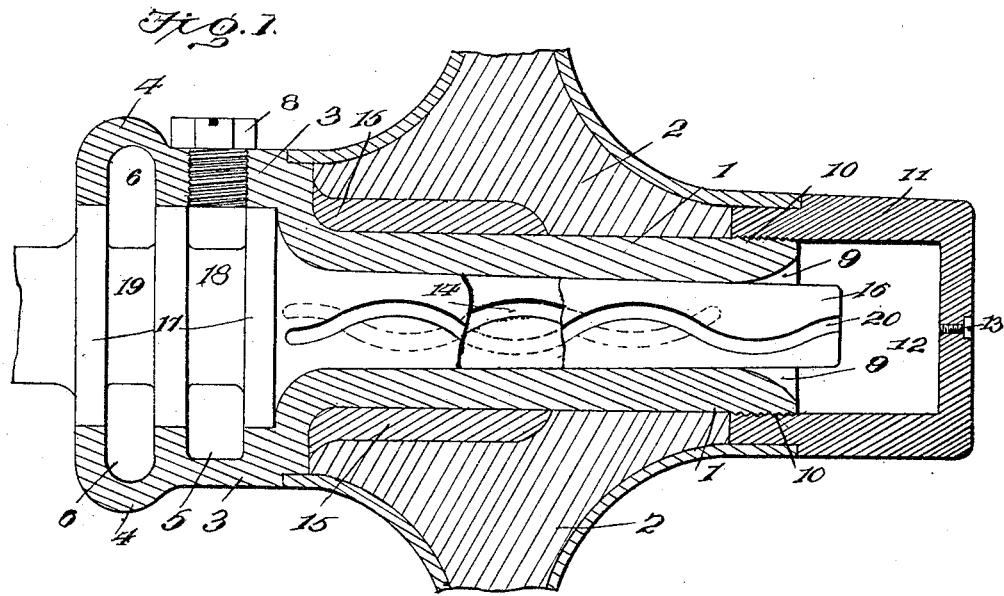
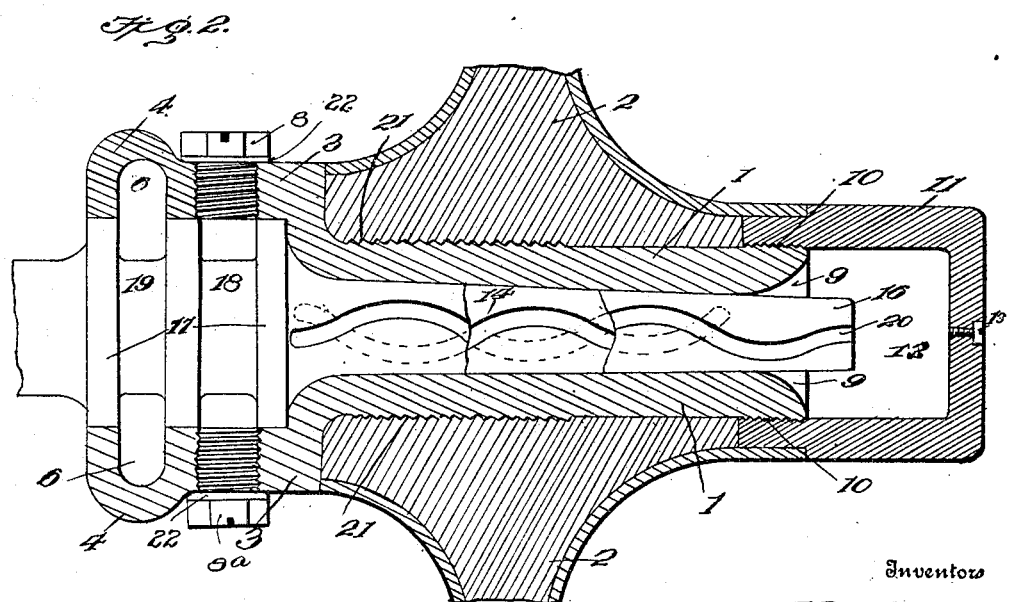

UNITED STATES PATENT OFFICE.

JOSEPH F. BASTEL AND JACOB F. BAUMGARTNER, OF ST. LOUIS, MISSOURI.

HUB FOR VEHICLE-WHEELS.

No. 904,112.  Specification of Letters Patent.  Patented Nov. 17, 1908.

Application filed October 21, 1907. Serial No. 398,531.

*To all whom it may concern:*

Be it known that we, JOSEPH F. BASTEL and JACOB F. BAUMGARTNER, citizens of the United States, residing at St. Louis, in the county of St. Louis City and State of Missouri, have invented certain new and useful Improvements in Hubs for Vehicle-Wheels, of which the following is a specification.

This invention comprehends certain new and useful improvements in hubs for vehicle wheels and relates more specifically to an improved boxing designed to be inserted in the hub of the wheel and provided with means for securing the hub upon a particularly formed spindle, without the use of the ordinary exterior nut. This boxing (which is the object of this invention) also provides means for its thorough lubrication without the necessity of removing it from the spindle.

With this and other objects in view as will more fully appear as the description proceeds, the invention consists in certain constructions and arrangements of parts that we shall hereinafter fully describe and then point out the novel features thereof in the appended claim.

For a full understanding of the invention and the merits thereof and to acquire a knowledge of the details of construction reference is to be had to the following description and accompanying drawings in which:—

Figure 1 is a longitudinal section of this improved boxing showing it secured in a wooden hub and mounted on its spindle, and Fig. 2. is a similar view with the boxing secured in a metallic hub.

Corresponding and like parts are referred to in the following description and indicated in all the views of the drawings by the same reference characters.

The numeral 1 designates this improved boxing which is inserted in a wooden hub 2, as shown, and which is formed at one end with a laterally extended or enlarged portion 3. One end of this enlarged portion 3 abuts against the interior end of the hub 2 and the other end is formed at its edge with a semi-circular rim 4. The enlarged portion 3 is formed in its inner surface with parallel grooves 5 and 6, transversely extending therearound and with a threaded aperture leading into the groove 5. This aperture is designed to accommodate a set screw 8, the head of said screw being so formed as to permit the adjustment of the screw by either a wrench or screw driver.

The other end of the boxing 1 projects out of the hub 2, the inner surface of the boxing being flared outward as shown at 9 and the outer surface being provided with the threads 10. The threaded portion 10 is designed to engage a relatively large threaded cap 11, the inner end of which abuts against the outer end of the hub 2, when the cap is screwed in place and which also draws the enlarged end 3 against the interior end of the hub thus holding the boxing in said hub. This cap is formed with an inner hollow portion 12 which serves as an oil supply well and which may be filled without removing the cap by means of a screw plug 13 removably secured in its outer end as shown. Preferably in the inner surface of the boxing leading from the end to which the cap 11 is secured, are longitudinally extending irregular and undulating grooves 14 designed to carry oil from the supply well 12 to lubricate the interior of the boxing.

Outwardly extending flanges 15 are provided on the outer surface of the boxing 1 as shown and are designed to be embedded in the wooden hub 2 to prevent the boxing from turning therein. The boxing 1 is designed to be mounted on an axle arm or spindle 16, said spindle being provided with a collar 17. This collar 17 is formed with parallel annular grooves 18 and 19 in registry respectively with the grooves 5 and 6 in the enlarged portion of the boxing. The groove 18 is designed to receive the end of the set screw 8 when it is adjusted to protrude into the inner portion of the boxing 1, and thereby holds the hub 2 securely on the spindle 16. The grooves 5 and 18, and 6 and 19 coact respectively to form wells to receive the oil or grease that works inward on the spindle 16. In the preferred construction of the spindle 16 it is formed with longitudinally extending irregular and undulating grooves 20 designed to lead oil from the supply well 12 to provide more complete lubrication.

In the practical operation of this invention the boxing is secured in the hub of a wheel which is then mounted on its spindle and may be held firmly thereon by adjusting the set screw so that it will project into the particular groove provided on the spindle for this purpose in which position the set screw allows the hub to turn freely on the spindle but prevents any inward or outward movement. The oil supply well is filled by removing the screw plug in the cap and the wheel is then ready for use. The flared portion 9 gives the oil in the supply well free access to the grooves in the boxing and spindle, while the movement of the wheel on the spindle causes the oil to be led by such grooves through the boxing for the lubrication thereof and to be thence discharged into the oil wells 18 and 19. The wheel may be easily and quickly removed from the spindle when desired, by turning the set screw so that it will be raised out of the groove in the collar of the spindle.

One modification of our invention for use in connection with metallic hubs is shown in Fig. 2. In this case threads 21 are provided on the outer surface of the boxing instead of the flanges 15, said threads being designed to engage threads formed in the hub as shown, and thus prevent any independent turning of the boxing relative to the hub.

It is obvious that our invention is not limited to the formation of the boxing and hub as separate elements, as these parts may readily be formed in one piece.

It is to be understood that our invention is not limited to the use of one set screw, for instance as shown by Fig. 2, a second set screw 8ª may be provided diametrically opposite the set screw 8. If desired we may also provide leather washers 22 under the heads of the respective set screws for the purpose of making a tighter joint and preventing the oil in the boxing from working out of the apertures in which said screws are mounted.

Having thus described the invention, what we claim is:—

The combination with an axle and its spindle, of a hub and its boxing journaled thereon, and provided at its outer end with an oil well, the inner surface of said boxing being flared outwardly at such end and being formed with longitudinally extending undulating grooves leading therefrom, and the spindle being correspondingly grooved, as and for the purpose set forth.

In testimony whereof we affix our signatures in presence of two witnesses.

JOSEPH F. BASTEL.
JACOB F. BAUMGARTNER.

Witnesses:
ROBT. E. COCHRAN,
JACOB JOHNSON.